United States Patent
Chou et al.

(10) Patent No.: US 9,350,529 B1
(45) Date of Patent: May 24, 2016

(54) METHOD AND APPARATUS FOR DETECTING LOGICAL SIGNAL

(71) Applicant: Realtek Semiconductor Corp., Hsinchu (TW)

(72) Inventors: Gerchih (Joseph) Chou, San Jose, CA (US); Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/665,144

(22) Filed: Mar. 23, 2015

(51) Int. Cl.
*H03D 3/24* (2006.01)
*H04L 7/033* (2006.01)
*H04L 25/49* (2006.01)

(52) U.S. Cl.
CPC ............ *H04L 7/033* (2013.01); *H04L 25/4923* (2013.01)

(58) Field of Classification Search
CPC ............................ H04L 7/033; H04L 25/4923
See application file for complete search history.

(56) References Cited

U.S. PATENT DOCUMENTS

| | | | | |
|---|---|---|---|---|
| 6,377,642 B1* | 4/2002 | Dollard | ................. | H04L 7/0334 375/344 |
| 2002/0034143 A1* | 3/2002 | Kaneshige | ............. | G11B 20/10 369/59.18 |
| 2007/0014344 A1* | 1/2007 | Maangat | ................... | H04B 3/04 375/229 |
| 2010/0086090 A1* | 4/2010 | Lin | ......................... | G11B 20/14 375/354 |
| 2010/0189207 A1* | 7/2010 | Jibry | ..................... | H04L 7/0062 375/371 |
| 2014/0192935 A1* | 7/2014 | Palusa | ..................... | H04L 7/033 375/340 |
| 2014/0270030 A1* | 9/2014 | Hammad | .............. | H04L 7/0079 375/371 |
| 2015/0091745 A1* | 4/2015 | Pagnanelli | ............ | H03M 3/468 341/143 |

\* cited by examiner

*Primary Examiner* — Syed Haider
(74) *Attorney, Agent, or Firm* — McClure, Qualey & Rodack, LLP

(57) ABSTRACT

A logical transmission system includes a driver configured to receive a source data and output a first voltage at a first node; a transmission line of a characteristic impedance configured to couple the first node to a second node; a three-point three-level slicer configured to receive a second voltage at the second node and output a first ternary signal, a second ternary signal, and a third ternary in accordance with a first reference voltage, a second reference voltage, a first clock, a second clock, and a third clock; and a CDR (clock-data recovery) unit configured to receive a reference clock, the first ternary signal, the second ternary signal, and the third ternary signal and output a recovered data, the first reference voltage, the second reference voltage, the first clock, the second clock, and the third clock.

20 Claims, 9 Drawing Sheets

METHOD AND APPARATUS FOR DETECTING LOGICAL SIGNAL

BACKGROUND OF THE INVENTION

1. Field of the Invention

The present invention generally relates to detection of a logical signal, and more specifically to a system and associated method for identifying and improving a logical signal.

2. Description of Related Art

Persons of ordinary skill in the art understand terms and basic concepts related to microelectronics that are used in this disclosure, such as "voltage," "current," "signal," "load," "logical signal," "clock," "trip point," "inverter," "buffer" "node," "transmission line," "characteristic impedance," "input impedance," "output impedance," "XOR gate," "DFF (data flip flop)," "digital-to-analog converter," and "multiplexer." Terms and basic concepts like these are apparent to those of ordinary skill in the art and thus will not be explained in detail here.

A schematic diagram of a logical signal transmission system 100 is shown in FIG. 1. The system 100 comprises: a driver circuit 110 comprising an inverter 111 receiving a logical signal D and outputting a source voltage $V_S$ to a first circuit node 121; a load 130 comprising a data detector 131 for receiving a load voltage $V_L$ from a second circuit node 122; and a transmission line 120 of characteristic impedance $Z_0$ for providing coupling between the first circuit node 121 and the second circuit node 122. The logical signal D is transmitted by the driver circuit 110 to reach the load 130 via the transmission line 120, resulting in the load voltage $V_L$ that is meant to be representing an inversion of the logical signal D. To ensure good quality of signal transmission, the output impedance of the driver circuit 110, denoted as $Z_S$ in FIG. 1, is configured to be approximately equal to the characteristic impedance $Z_0$, and also the input impedance of the receiver 130, denoted as $Z_L$ in FIG. 1, is configured to be approximately equal to the characteristic impedance $Z_0$. In practice, there are always some parasitic capacitances (not shown in FIG. 1, but obvious to those of ordinary skill in the art) present in the transmission path. Said parasitic capacitances introduce inter-symbol interference and degrades signal integrity for the load voltage $V_L$ and adversely increase a probability of error of data detection by the data detector 131.

What are desired is a method and apparatus for ameliorating a logical signal.

BRIEF SUMMARY OF THIS INVENTION

An objective of the present invention is to identify a transition of a logical signal and improve accuracy of resolving the logical signal.

An objective of the present invention is to detect a timing of a logical signal.

An objective of the present invention is to perform clock-data recovery for a logical signal.

An objective of the present invention is to improve the resolution of a logical signal.

In an embodiment, a logical transmission system comprises: a driver configured to receive a source data and output a first voltage at a first node; a transmission line of a characteristic impedance configured to couple the first node to a second node; a three-point three-level slicer configured to receive a second voltage at the second node and output a first ternary signal, a second ternary signal, and a third ternary in accordance with a first reference voltage, a second reference voltage, a first clock, a second clock, and a third clock; and a CDR (clock-data recovery) circuit configured to receive a reference clock, the first ternary signal, the second ternary signal, and the third ternary signal and output a recovered data, the first reference voltage, the second reference voltage, the first clock, the second clock, and the third clock.

In an embodiment, the CDR circuit comprises: a delay chain configured to receive the reference clock and output the first clock, the second clock, and the third clock in accordance with a first delay code, a second delay code, and a third delay code, respectively; a resolution circuit configured to receive the first ternary signal, the second ternary signal, and the third ternary signal and output the recovered data, a first alternative recovered data, and a second alternative recovered data; and a DSP (digital signal processing) circuit configured to receive the recovered data, the first alternative recovered data, and the second alternative recovered data and output the first delay code, the second delay code, the third delay code, the first reference voltage, and the second reference voltage.

In an embodiment, the DSP circuit adapts the first delay code, the second delay code, and the third delay code so that the first alternative recovered data and the second alternative recovered data are equally likely to agree with the recovered data. In an embodiment, the DSP circuit adapts the first reference voltage so that the first alternative recovered data and the second alternative recovered data are equally likely to agree with the recovered data when the recovered data was in a first logical state in a previous clock cycle. In an embodiment, the DSP circuit adapts the second reference voltage so that the first alternative recovered data and the second alternative recovered data are equally likely to agree with the recovered data when the recovered data was in a second logical state in the previous clock cycle.

In an embodiment, a method comprises: receiving a source data; driving a first voltage at a first node in accordance with the source data; propagating the first voltage to a second node via a transmission line of a characteristics impedance to establish a second voltage; shunting the second node with a shunt resistor of resistance approximately equal to the characteristic impedance; slicing the second voltage into a first ternary signal, a second ternary signal, and a third ternary signal in accordance with a first clock, a second clock, and a third clock, respectively, based on comparing the second voltage with a first reference voltage and with a second reference voltage; resolving a recovered data, a first alternative recovered data, and a second alternative recovered data based on analyzing the first ternary signal, the second ternary signal, and the third ternary signal; and adapting the first reference voltage, the second reference voltage, the first clock, the second clock, and the third clock in accordance with a relationship among the recovered data, the first alternative recovered data, and the second alternative recovered data.

In an embodiment, the first clock, the second clock, and the third clock are adapted so that the first alternative recovered data and the second alternative recovered data are equally likely to agree with the recovered data. In an embodiment, the first reference voltage is adapted so that the first alternative recovered data and the second alternative recovered data are equally likely to agree with the recovered data when the recovered data was in a first logical state in a previous clock cycle. In an embodiment, the second reference voltage is adapted so that the first alternative recovered data and the second alternative recovered data are equally likely to agree with the recovered data when the recovered data was in a second logical state in the previous clock cycle.

DETAILED DESCRIPTION OF THE DRAWINGS

DETAILED DESCRIPTION OF THIS INVENTION

The present invention generally relates to reception of logical signal and more particularly to a system that can improve the quality or resolution of the logical signal. While the specification describes several example embodiments of the invention considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the invention.

In this disclosure, a logical signal is a signal of two states: "high" and "low," which can also be re-phrased as "1" and "0." For brevity, when a logical signal is in the "high" ("low") state, it can be simply stated that the logical signal is "high" ("low"), or alternatively, the logical signal is "1" ("0"). Also, for brevity, sometimes the quotation marks are omitted, and simply state that the logical signal is high (low), or alternatively, the logical signal is 1 (0), with the understanding that the statement is made in the context of describing a state of the logical signal. A logical signal is embodied by a voltage; the logical signal is "high" ("low") when the voltage is above (below) an associated trip point of a recipient logical device that receives and processes the logical signal; for brevity, the associated trip point is simply referred to as the trip point of the logical signal. In this disclosure, the trip point of a first logical signal may not be necessarily the same as the trip point of a second logical signal.

A clock signal is a periodic logical signal.

If the logical signal is "high," (or "1") it is said to be "asserted." If the logical signal is "low," (or "0") it is said to be "de-asserted."

Figure 1:
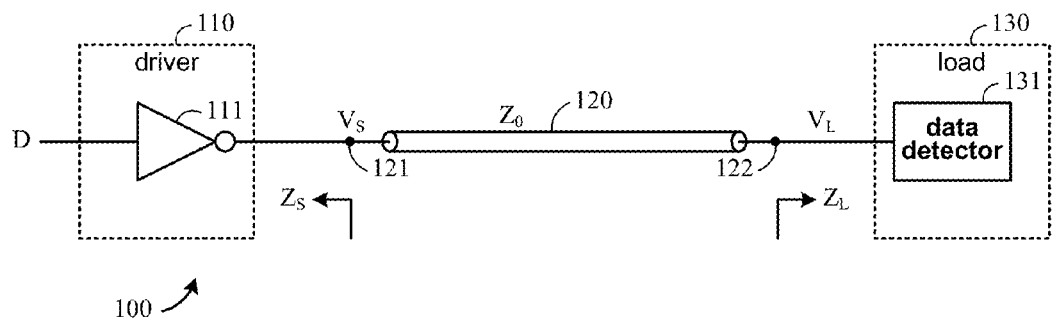
FIG. 1 shows a schematic diagram of a prior art logical signal transmission system.
Figure 2A:
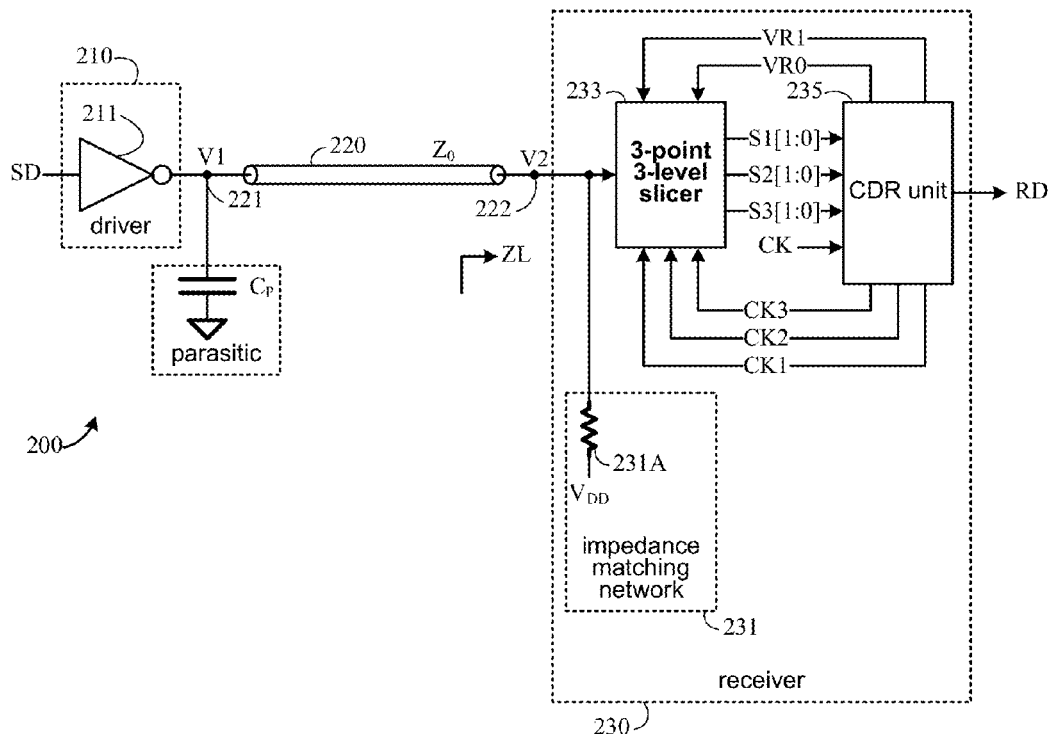
FIG. 2A shows a schematic diagram of a logical signal transmission system in accordance with an embodiment of the present invention.

FIG. 2A shows a schematic diagram of a logical signal transmission system 200 in accordance with an embodiment of the present invention. The logical signal transmission system 200 comprises: a driver 210 (which in this particular embodiment comprises an inverter 211) configured to receive a source data SD, which is a logical signal, and drive a first voltage V1 at a first circuit node 221; a receiver 230 configured to receive a second voltage V2 at a second circuit node 222 and output a recovered data RD; a transmission line 220 of characteristic impedance $Z_0$ configure to couple the first circuit node 221 to the second circuit node 222. The source data SD is transmitted by the driver 210 to reach the receiver 230 via the transmission line 220, resulting in the second voltage V2 that is meant to be representing an inversion of the source data SD.

Receiver 230 comprises: an impedance matching network 231 (which in this particular embodiment comprises a resistor 231A shunt to $V_{DD}$, which in this disclosure denoted a power supply node) configured to make an input impedance ZL of the receiver 230 approximately equal to the characteristic impedance $Z_0$; a 3-point 3-level slicer 233 configured to receive the second voltage V2 and output a first ternary signal S1[1:0], a second ternary signal S2[1:0], and a third ternary signal S3[1:0], by comparing the second voltage V2 with both a first reference voltage VR1 and a second reference voltage VR0 in accordance with a first timing defined by a first clock CK1, a second timing defined by a second clock CK2, and a third timing defined by a third clock CK3, respectively; a CDR (clock data recovery) unit 235 configured to receive the first ternary signal S1[1:0], the second ternary signal S2[1:0], and the third ternary signal S3[1:0] and also a reference clock signal CK and output the recovered data RD, the first reference voltage VR1, the second reference voltage VR0, the first clock CK1, the second clock CK2, and the third clock CK3.

For brevity, hereafter in this disclosure, the following short forms of referencing are used: the second voltage V2 is simply referred to as V2; the first clock CK1 is simply referred to as CK1; the second clock CK2 is simply referred to as CK2; the third clock CK3 is simply referred to as CK3; the first ternary signal S1[1:0] is simply referred to as S1[1:0]; the second ternary signal S2[1:0] is simply referred to as S2[1:0]; the third ternary signal S3[1:0] is simply referred to as S3[1:0]; the first reference voltage VR1 is simply referred to as VR1; and the second reference voltage VR0 is simply referred to as VR0.

A ternary signal is a signal of three possible values and can be represented by a two-bit signal. Throughout this disclosure, a bus notation is used to describe a multi-bit signal. For instance, S1[1:0] (S2[1:0], S3[1:0]) is a two-bit signal comprising a first bit S1[1] (S2[1], S3[1]) and a second bit S1[0] (S2[0], S3[0]).

One feature of receiver 230 is that CDR unit 235 performs a clock-data recovery based on a result of a 3-point 3-level slicing performed by the 3-point 3-level slicer 233, and also adjusts the 3-point 3-level slicer 233 in a closed-loop manner to optimize a performance of the clock-data recovery. Generally speaking, a 3-level slicer slices an input signal into a ternary signal that has three possible values sliced in accordance with two reference voltages; a 3-point slicer slices an input signal at three timing instants; and a 3-point 3-level slicer slices an input signal into three ternary signals (each having three possible values) at three timing instants, respectively. As far as the 3-point 3-level slicer 233 is concerned: the input signal is V2, the two reference voltages are VR1 and VR0, the three ternary signals are S1[1:0], S2[1:0], and S3[1:0], and the three timing instants are defined by CK1, CK2, and CK3, respectively.

Figure 2B:
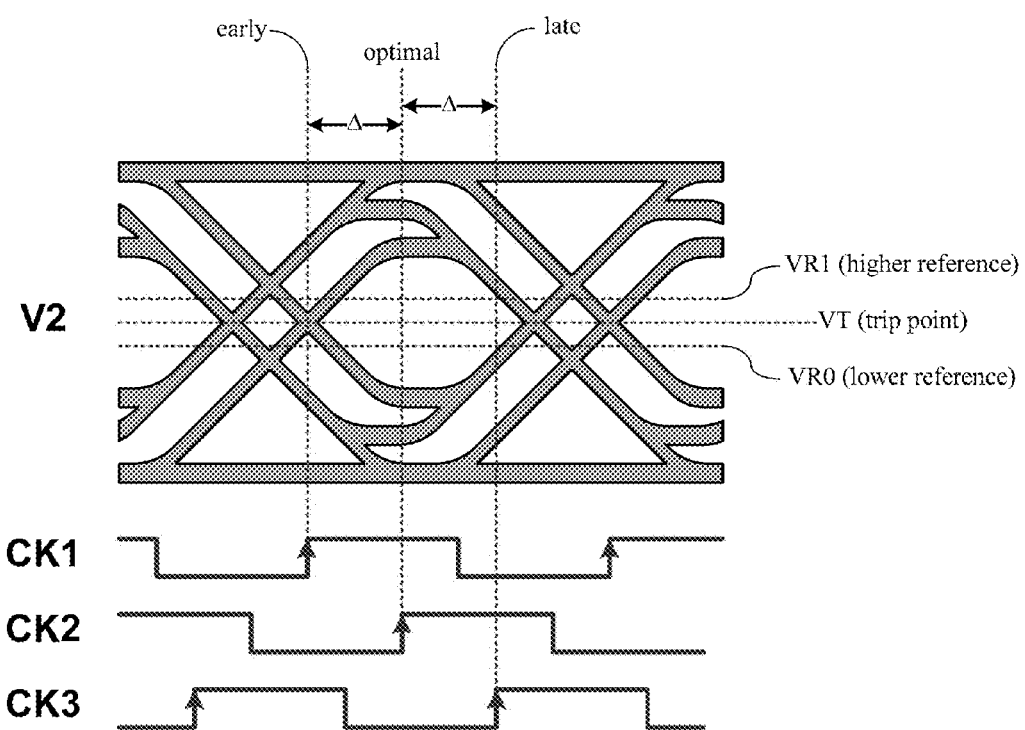
FIG. 2B shows an exemplary waveform and a timing diagram for the logical signal transmission system of FIG. 2A.

FIG. 2B shows an exemplary waveform of V2 together with a timing diagram of the three clocks CK1, CK2, and CK3. Such a waveform, often referred to as an "eye diagram," can be observed using an oscilloscope. The concept of an "eye diagram" is well known to those of ordinary skill in the art and thus is not described in detail herein.

Of the two reference voltages VR1 and VR0, VR1 is a higher reference used to identify a high-to-low transition of V2, while VR0 is a lower reference used to identify a low-tohigh transition of V2. As shown in FIG. 2B, VR1 is higher than VT, which denotes a trip point of V2, while VR0 is lower than VT.

Of the three clocks CK1, CK2, and CK3: CK2 is an "optimal" clock that aligns with an optimal timing for resolving V2 (in a steady state of the CDR unit 235); CK1 is an "early" clock that is earlier than CK2 by a timing difference of Δ; and CK3 is a "late" clock that is later than CK2 by the same timing difference of Δ. Note that an optimal timing is usually close to a center of an "eye," but not necessarily exactly at the center of the "eye."

When V2 is higher than VR1, V2 is comfortably above the trip point VT and therefore can be reliably resolved as high; when V2 is lower than VR0, V2 is comfortably below the trip point VT and therefore can be reliably resolved as low; when V2 is lower than VR1 but higher than VR0, V2 is in a proximity of the trip point VT, and thus in a transitional state, undergoing either a high-to-low transition or low-to-high transition.

Figure 2C:
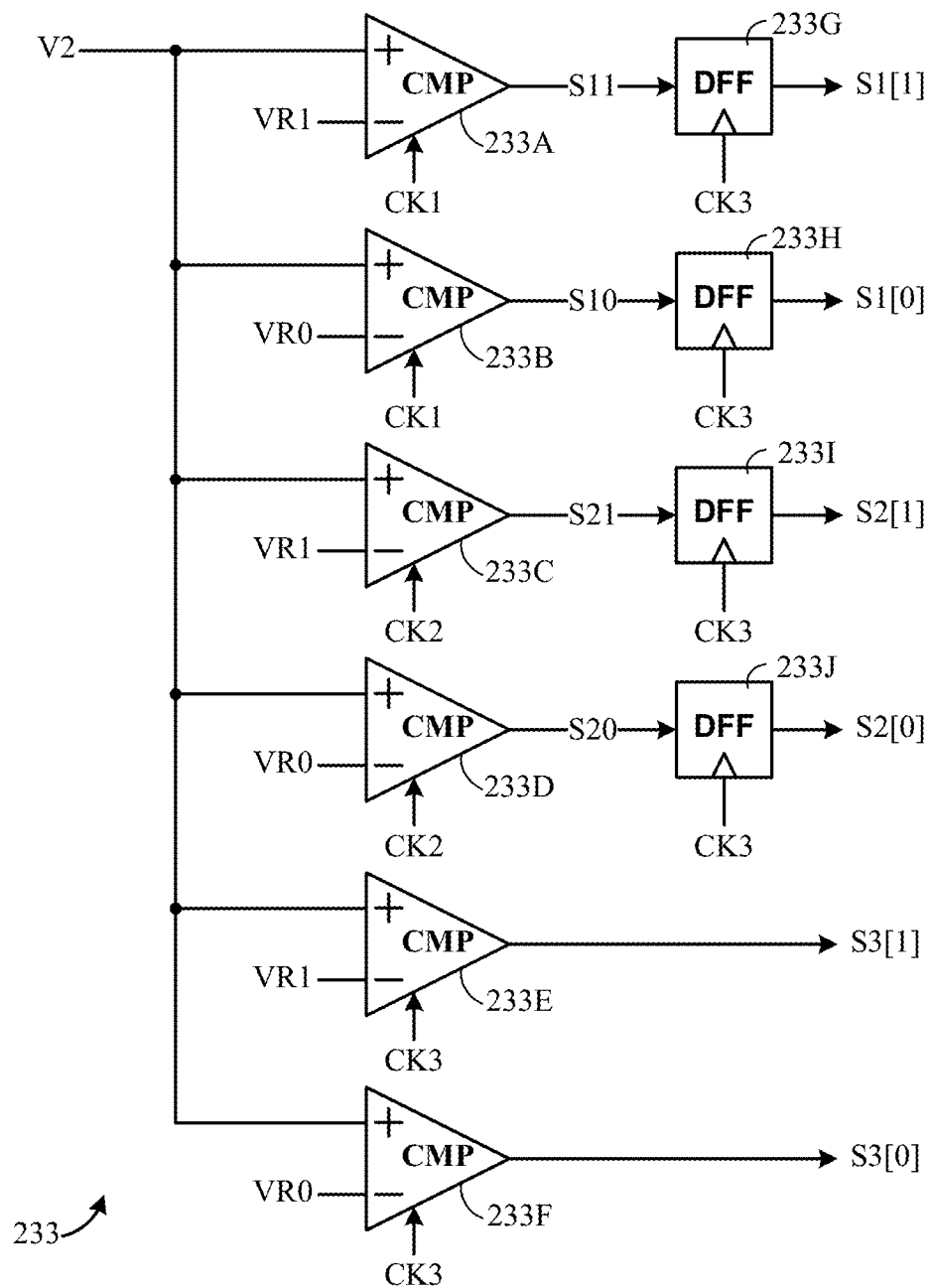
FIG. 2C shows a schematic diagram of a 3-point 3-level slicer in accordance with an embodiment of the present invention.

FIG. 2C shows a schematic diagram of the 3-point 3-level slicer 233 in accordance with an embodiment of the present invention. The 3-point 3-level slicer 233 comprises a first (second, third, fourth, fifth, sixth) comparator 233A (233B, 233C, 233D, 233E, 233F) configured to compare V2 with VR1 (VR0, VR1, VR0, VR1, VR0) at a rising edge of CK1 (CK1, CK2, CK2, CK3, CK3), resulting in a first (second, third, fourth, fifth, sixth) decision denoted as S11 (S10, S21, S20, S3[1], S3[0]). The 3-point 3-level slicer further comprises a first (second, third, fourth) DFF 233G (233H, 233I, 233J) configured to sample the first (second, third, fourth) decision S11 (S10, S21, S20) at a rising edge of CK3, resulting in a first (second, third, fourth) re-timed decision S1[1] (S1[0], S2[1], S2[0]). The first re-timed decisions S1[1] and the second re-timed decision S1[0] combine to form S1[1:0]. The third re-timed decisions S2[1] and the fourth re-timed decision S2[0] combine to form S2[1:0]. The fifth decision S3[1] and the sixth decision S3[0] combine to form S3[1:0]. Here, DFF stands for data flip-flop, which is well known in prior art and thus not described in detail. Comparators are also well known in prior art and thus not described in detail. The four DFF 233G, 233H, 233I, and 233J are used for a purpose of re-timing so that the three ternary signals S1[1:0], S2[1:0], and S3[1:0] are all in the same clock domain (of CK3) so that they can be easily processed together in the CDR unit 235.

Figure 3A:
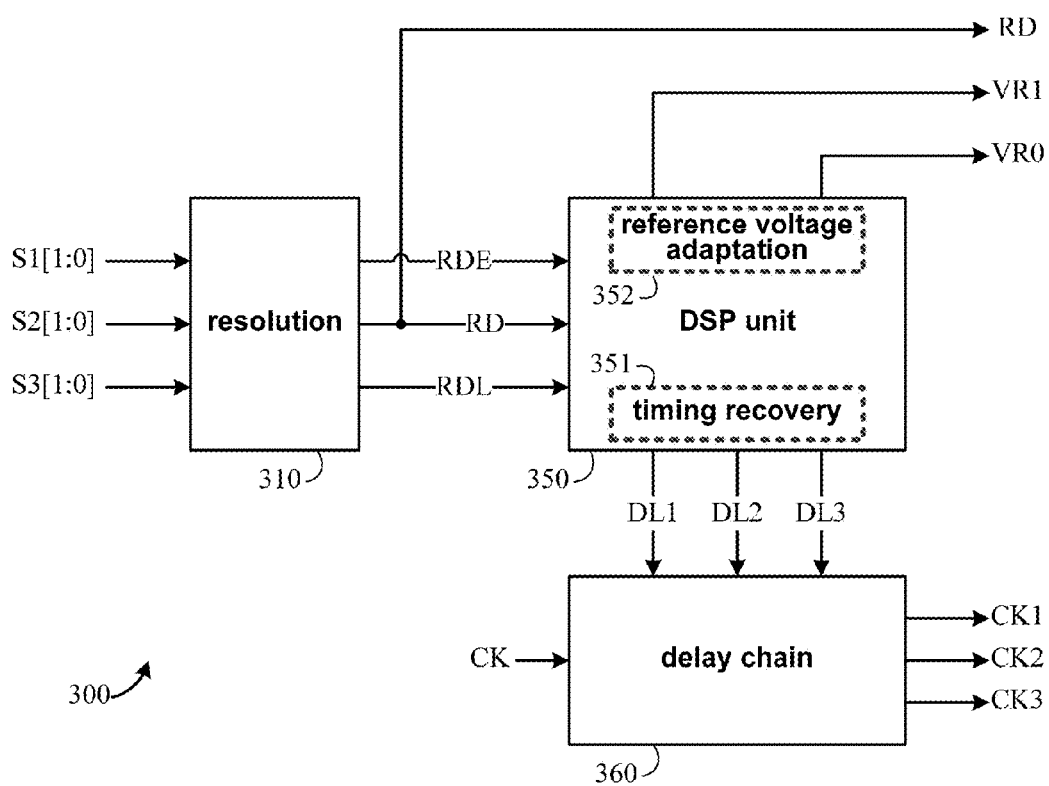
FIG. 3A shows a functional block diagram of a CDR unit in accordance with an embodiment of the present invention.

FIG. 3A depicts a functional block diagram of a CDR unit 300 suitable for embodying the CDR unit 235 of FIG. 2A in accordance with an embodiment of the present invention. The CDR unit 300 comprises: a resolution circuit 310; a DSP (digital signal processing) unit 350; and a delay chain 360. The resolution circuit 310 is configured to receive the three ternary signals S1[1:0], S2[1:0], and S3[1:0] and output the recovered data RD, a first alternative recovered data RDE, and a second alternative recovered data RDL. For brevity, hereafter: the recovered data RD is imply referred to as RD; the first alternative recovered data RDE is simply referred to as RDE; and the second alternative recovered data RDL is simply referred to as RDL. The DSP unit 350 is configured to receive RDE, RD, and RDL and output VR1, VR0, a first delay code DL1, a second delay code DL2, and a third delay code DL3. For brevity, hereafter: the first delay code DL1 is simply referred to as DL1; the second delay code DL2 is simply referred to as DL2; and the third delay code DL3 is simply referred to as DL3. Delay chain 360 is configured to receive the reference clock CK and output CK1, CK2, and CK3, in accordance with DL1, DL2, and DL3, respectively.

Figure 3B:
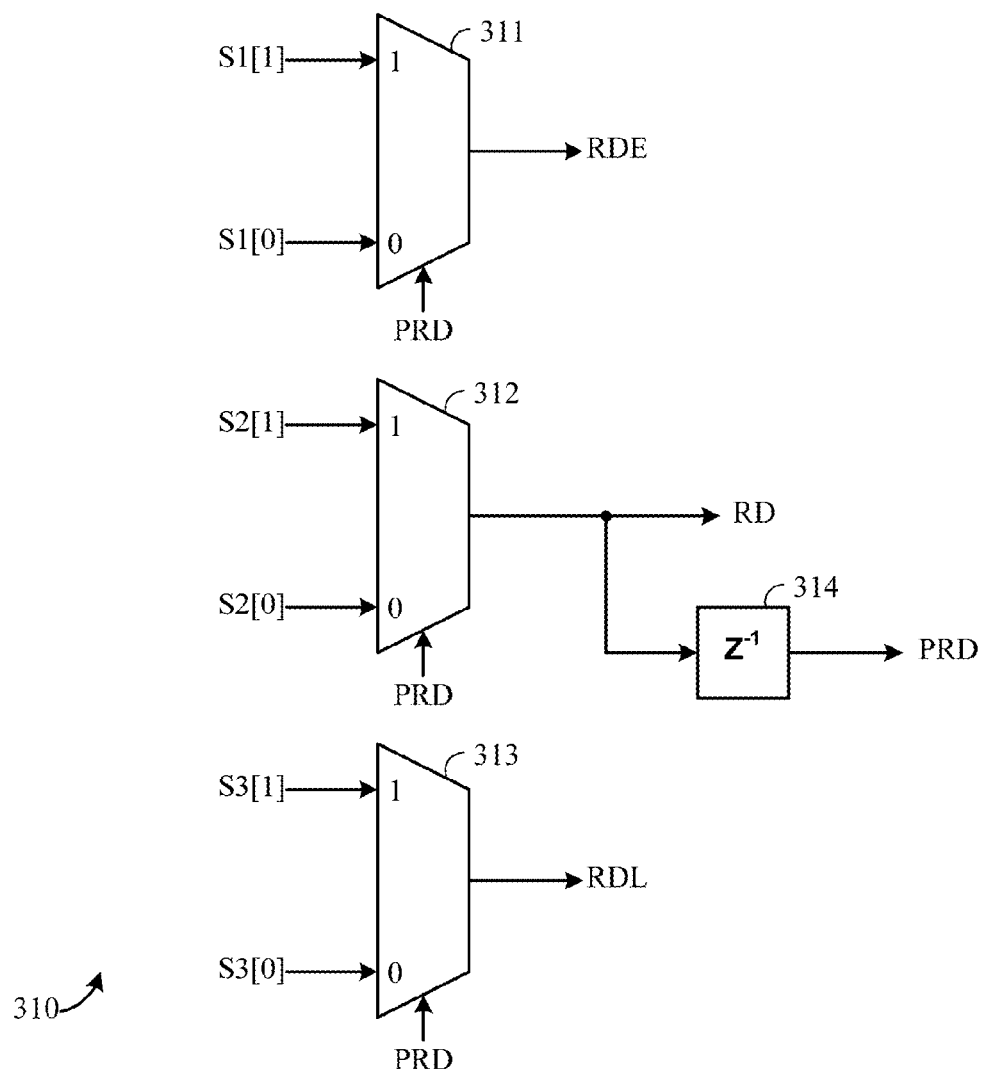
FIG. 3B shows a schematic diagram of a resolution circuit in accordance with an embodiment of the present invention.

FIG. 3B shows a schematic diagram of an embodiment of the resolution circuit 310, which comprises a first (second, third) multiplexers 311 (312, 313) configured to receive S1[1:0] (S2[1:0], S3[1:0]) and output RDE (RD, RDL) in accordance with an internal logical signal PRD, and a unit delay circuit 314 configured to receive RD and output the internal logical signal PRD. The notation "$z^{-1}$" denotes a unit cycle delay of a digital signal; such notation is widely used in the prior art and thus not described in detail here. The internal logical signal PRD is a unit cycle delay of RD, and therefore represents the previous value of RD in the previous clock cycle. Note that S1[1:0], S2[1:0], and S3[1:0] are all timed in the clock domain of CK3, and therefore "clock cycle" here refers to "clock cycle of CK3." Remember that S2[1:0] is obtained by comparing V2 with both VR1 and VR0 at a rising edge of CK2 (see FIG. 2B). When V2 is higher (lower) than VR1 (VR0) at the rising edge of CK2, V2 must be also higher (lower) than VR0 (VR1), and therefore S2[1] and S2[0] are both high (low) and RD is resolved as high (low) by the second multiplexer 312, regardless of PRD. When V2 is lower than VR1 but higher than VR0 at the rising edge of CK2, S2[1] is low but S2[0] is high, indicating V2 is undergoing a transition. There are two scenarios. In a first (second) scenario where PRD is 1 (0), the second multiplexer 312 selects S2[1] (S2[0]) and therefore RD is low (high); in this case, V2 was high (low) in the previous clock cycle and is undergoing a high-to-low (low-to-high) transition in the present clock cycle, but fails to fall below (rise above) VR0 (VR1) due to a slowdown in the transition (e.g., due to parasitic capacitor $C_p$ in FIG. 2A). In either scenario, the second multiplexer 312 selects either S2[1] or S2[0] in accordance with PRD, but the end result of RD is always a logical inversion of PRD, since V2 is undergoing a transition. The same principle applies to the first (third) multiplexer 311 (313) for resolving RDE and RDL. However, RDE (RDL) is resolved based on S1[1:0] (S3[1:0]), which is sliced in accordance with CK1 (CK3), reflecting a resolution of V2 taken at a timing earlier (later) then optimal.

Figure 3C:
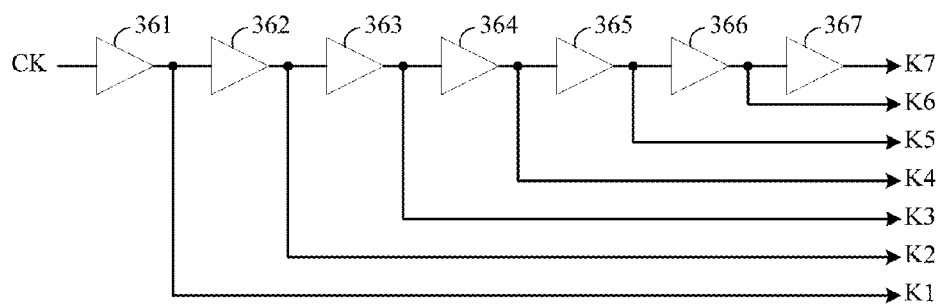
FIG. 3C shows a schematic diagram of a delay chain in accordance with an embodiment of the present invention.
Figure 3C:
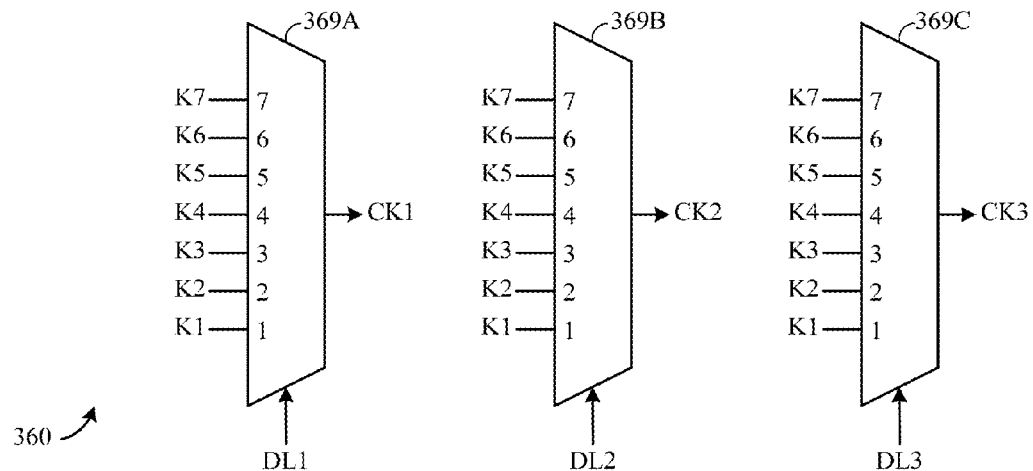

FIG. 3C depicts a schematic diagram of an embodiment of the delay chain 360, which comprises: a plurality of buffers 361~367 configured in a cascade topology to receive the reference clock signal CK and output a plurality of intermediate clock signals K1~K7, respectively (by way of example but not limitation, seven buffers and seven intermediate clock signals are shown here); a first (second, third) multiplexer 369A (369B, 369C) configured to receive said plurality of intermediate clock signals K1~K7 and output CK1 (CK2, CK3), in accordance with a value of DL1 (DL2, DL3). For instance, if DL1 is 2, then K2 is selected as CK1; if DL2 is 4, then K4 is selected as CK2; if DL3 is 6, then K6 is selected as CK3. Buffers and multiplexers are well known to those of ordinary skill in the art and thus not described in detail here. Those of ordinary skill in the art also appreciate that, CK1 (CK2, CK3) is a delayed version of the reference clock signal CK with an amount of delay specified by DL1 (DL2, DL3). A larger value of DL1 (DL2, DL3) leads to a larger amount of delay for CK1 (CK2, CK3), while a smaller value of DL1 (DL2, DL3) leads to smaller amount of delay for CK1 (CK2, CK3). Besides, the amount of delay of CK1 (CK2, CK3) increases (decreases) linearly with an increase (decrease) of the value of DL1 (DL2, DL3). Whenever D2 is updated, DL1 and DL3 are also updated, such that DL1 is always smaller than DL2 by an offset value DOS, and DL3 is always greater than DL2 by the same offset value DOS; that is: DL1=DL2−DOS, and DL3=DL2+DOS. By this arrangement, CK1 is always ahead of CK2 by a timing offset (that is, the timing distance Δ in FIG. 2B), while CK3 is always behind CK2 by the same timing offset, which is determined by the offset value DOS. In this manner, CK1 is configured to be an early clock, while CK3 is configured to be a late clock, as shown in FIG. 2B.

The DSP unit 350 comprises two functional units: timing recovery unit 351, configured to adapt DL1, DL2, and DL3; and reference voltage adaptation unit 352, configured to adapt VR1 and VR0. These units are explained as follows.

The timing recovery unit 351 examines a relationship among RDE, RD, and RDL to detect a timing error of CK2, and adjusts the timing of CK2 accordingly via updating the value of DL2. If the timing recovery unit 351 detects a timing error that suggests CK2 is positioned too early (late), it increments (decrements) the value of DL2 to increase (decrease) the amount of delay for CK2 to correct the timing error. In any case, as mentioned earlier, DL1 and DL3 are also updated whenever DL2 is updated, so that the relative timings among CK1, CK2, and CK3 always remain the same.

Figure 3D:
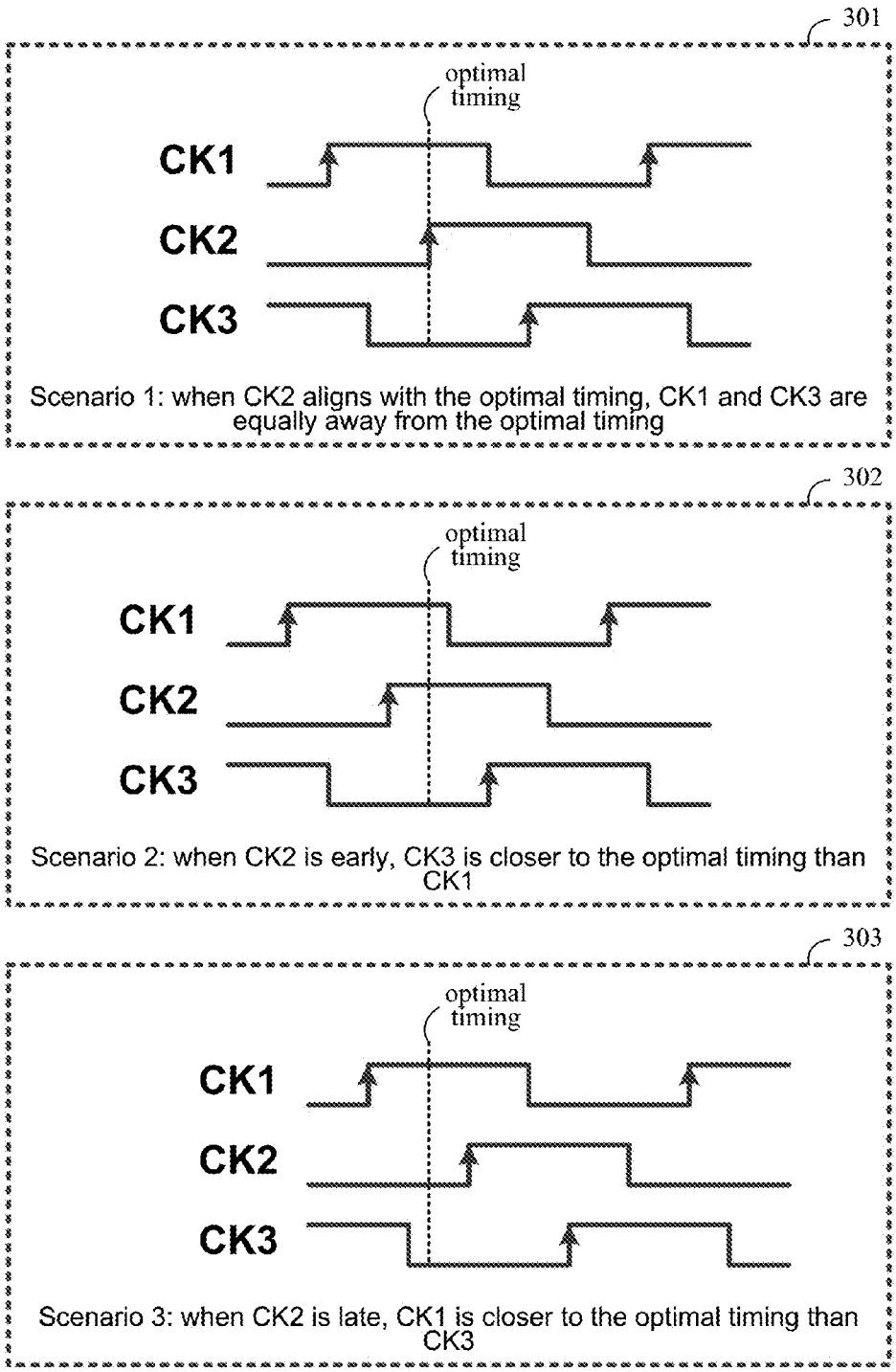
FIG. 3D shows three scenarios of timing for the CDR unit of FIG. 3A.

Sampling V2 at an optimal timing leads to a most reliable resolution, while sampling V2 at a subpar timing leads to a less reliable resolution. FIG. 3D shows a timing diagram of CK1, CK2, CK3 in three scenarios. In a first scenario 301: when CK2 aligns with the optimal timing, CK1 and CK3 are equally away from the optimal timing; in this case, RDE and RDL are equally unreliable, and thus equally likely to disagree with RD. In a second scenario 302, when CK2 is early (with respect to the optimal timing), CK3 is closer to the optimal timing than CK1; in this case, RDL is more reliable than RDE, and RD is more likely to agree with RDL than to agree with RDE. When CK2 is late, CK1 is closer to the optimal timing than CK3; in this case, RDE is more reliable than RDL, and RD is more likely to agree with RDE than to agree with RDL. Having this in mind, a timing error signal TE is established, which is a ternary signal of three possible values: 1, −1, and 0, indicating the timing of CK2 is early, late, and uncertain, respectively. For brevity, hereafter, the timing error signal TE is simply referred to as TE. The timing of CK2 is uncertain if RDL agrees with RDE; in this case, TE is set to 0. The timing of CK2 is deemed early if RDL disagrees with RDE but agrees with RD; in this case, TE is set to 1. The timing CK2 is deemed late if RDE disagrees with RDL but agrees with RD; in this case, TE is set to −1. TE can be used to adjust the timing of CK2.

Figure 3E:
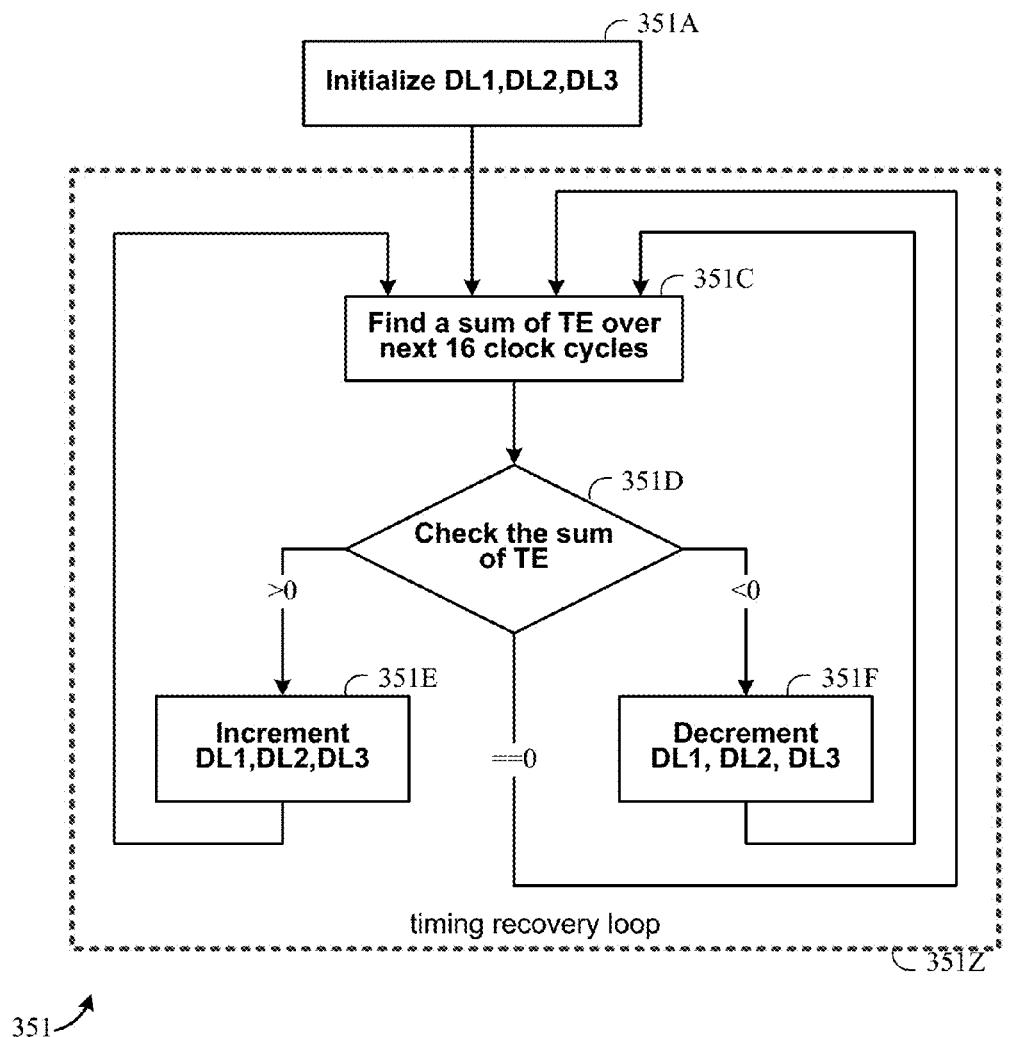
FIG. 3E shows a flow diagram of an algorithm of timing recovery in accordance with an embodiment of the present invention.

FIG. 3E shows an algorithm 351 used by the DSP unit 350 to perform timing recovery in accordance with an embodiment of the present invention. Algorithm 351 comprises the following steps:

Step 351A: initialize DL1, DL2, DL3. Let DL1=DL2−DOS and DL3=DL2+DOS, where DOS is the offset value mentioned earlier.

Step 351C: find a sum of TE over the next 16 clock cycles.

Step 351D: check the sum of TE over said 16 clock cycles. If the sum is greater than zero, go to Step 351E; else if the sum is smaller than zero, go back to Step 351F; else go back to Step 351C.

Step 351E: increment DL1, DL2, and DL3 (i.e. let DL1=DL1+1, DL2=DL2+1, DL3=DL3+1) and go back to Step 351C.

Step 351F: decrement DL1, DL2, and DL3 (i.e. let DL1=DL1−1, DL2=DL2−1, DL3=DL3−1) and go back to Step 351C.

Upon entering Step 351C, the algorithm 351 is in a timing recovery loop 351Z, wherein it iteratively adjusts DL2, and thus the timing of CK2 in a closed-loop manner, so as to make a mean value of TE approach zero, indicating CK2 aligns with the optimal timing. Also, note that whenever DL2 is adapted, DL1 and DL3 are also adapted so that the relative timings among CK1, CK2, and CK3 remain the same.

Note that the DSP unit 350 works in the clock domain of CK3. Therefore, clock cycles here refer to clock cycles of CK3.

Note that "16 clock cycles" in algorithm 351 are by way of example but not limitation. If it is chosen to use more (less) clock cycles, the adaptation of the timing will be slower (faster) but less (more) prone to noise.

The reference voltage adaptation unit 352 examines a relationship among RDE, RD and RDL to determine whether VR1 is positioned too high or too low, and also examines a relationship among RDE, RD, and RDL to determine whether VR0 is positioned too high or too low. When the timing recovery settles, CK2 is of an optimal timing, CK1 is of an early timing, and CK3 is of a late timing. The late timing is prone to prematurely identifying a transition that is coming in the next clock cycle, while the early timing is prone to missing a transition that is taking place in the present clock cycle.

As mentioned earlier, VR1 is used to identify a high-to-low transition; a higher value of VR1 leads to a higher probability of identifying a high-to-low transition. When RD is high but RDL is low, it indicates CK3 sees a high-to-low transition while CK2 doesn't. This indicates that CK3 prematurely identifies the high-to-low transition, and it occurs more frequently when VR1 is set higher. On the other hand, when RD is low but RDE is high, it indicates CK2 sees a high-to-low transition while CK1 doesn't. This suggests CK1 misses the high-to-low transition, and it occurs more frequently when VR1 is set lower. A first voltage error indicator VE1 is introduced, indicating an error associated with high-to-low transition, either premature identification or miss. For brevity, hereafter, the first voltage error indicator VE1 is simply referred to as VE1. In an embodiment, VE1 is set to 0, except in two cases wherein VE1 must be set to 1: first, when RDE is high, RD is low, and RDL is low (i.e., CK1 misses a high-to-low transition); and second, when RDE is high, RD is high, and RDL is low (i.e., CK3 prematurely identifies a high-to-low transition).

As mentioned earlier, VR0 is used to identify a low-to-high transition; a lower value of VR0 leads to a higher probability of identifying a low-to-high transition. When RD is low but RDL is high, it indicates CK3 sees a low-to-high transition while CK2 doesn't. This suggests CK3 prematurely identifies the low-to-high transition, and it occurs more frequently when VR0 is set lower. On the other hand, when RD is high but RDE is low, it indicates CK2 sees a low-to-high transition while CK1 doesn't. This suggests CK1 misses the low-to-high transition, and it occurs more frequently when VR0 is set higher. A second voltage error indicator VE0 is introduced, indicating an error associated with low-to-high transition, either premature identification or miss. For brevity, hereafter, the second voltage error indicator VE0 is simply referred to as VE0. In an embodiment, VE0 is set to 0, except in two cases wherein VE0 must be set to 1: first, when RDE is low, RD is low, and RDL is high (i.e., CK3 prematurely identifies a high-to-low transition); and second, when RDE is low, RD is high, and RDL is high (i.e., CK1 misses a high-to-low transition).

While VE1 and VE0 are useful indicators, they are too raw to be directly used for adjusting VR1 and VR0, respectively. A first error count EC1 is introduced, obtained by summing VE1 over 1024 clock cycles. A second error count EC0 is introduced, obtained by summing VE0 over 1024 clock cycles. A first direction indicator DIR1 is introduced, which is a binary signal having two values, 1 and −1, indicating VR1 is being incremented or decremented. A second direction indicator DIR0 is also introduced, which is a binary signal having two values, 1 and −1, indicating VR0 is being incremented or decremented. A parameter DV is introduced, indicating an amount of incremental change for either VR1 or VR0.

Figure 3F:
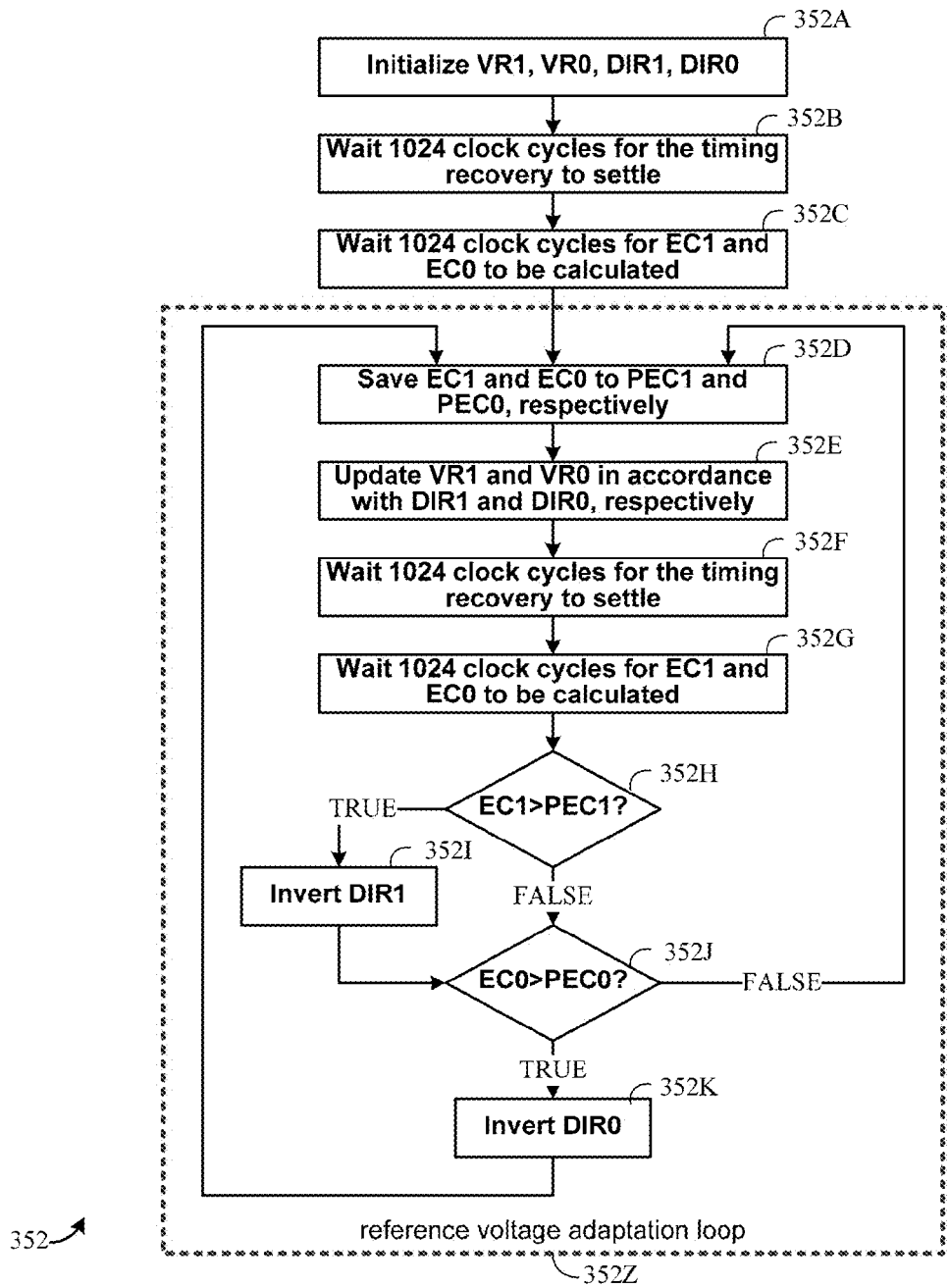
FIG. 3F shows a flow diagram of an algorithm of reference voltage adaptation in accordance with an embodiment of the present invention.

FIG. 3F shows an algorithm 352 used by the DSP unit 350 to perform reference voltage adaptation in accordance with an embodiment of the present invention. Algorithm 352 comprises the following steps:

Step 352A: initialize VR1, VR0, DIR1, and DIR0.

Step 352B: wait 1024 clock cycles for timing recovery to settle, for instance, using algorithm 351 of FIG. 3D.

Step 352C: wait 1024 clock cycles for EC1 and EC0 to be calculated.

Step 352D: save EC1 and EC0 to PEC1 and PEC0, respectively. Here, PEC1 is a previous value of EC1 before an adaptation of VR1; PEC0 is a previous value of EC0 before an adaptation of VR0.

Step 352E: update VR1 and VR0 in accordance with DIR1 and DIR0, respectively. If DIR1 is 1, VR1 is incremented (i.e., raise VR1 by DV), otherwise VR1 is decremented (i.e. lower VR1 by DV). If DIR0 is 1, VR0 is incremented (i.e. raise VR0 by DV), otherwise VR0 is decremented (i.e. lower VR0 by DV). Here, DV is the parameter indicating the amount of incremental change for either VR1 or VR0, as mentioned earlier.

Step 352F: wait 1024 clock cycles for timing recovery to settle, for instance, using algorithm 351 of FIG. 3D.

Step 352G: wait 1024 clock cycles for EC1 and EC0 to be calculated.

Step 352H: check if EC1 is greater than PEC1. If true, go to step 352I, otherwise go to Step 352J.

Step 352I: invert DIR1. That is, if DIR1 is currently 1, change it to −1; otherwise, change it to 1.

Step 352J: check if EC0 is greater than PEC0. If true, go to step 352K, otherwise go back to Step 352D.

Step 352K: invert DIR0 and then go back to Step 352D. That is, if DIR0 is currently 1, change it to −1; otherwise, change it to 1.

Upon entering Step 352D, the algorithm 352 is in a reference voltage adaptation loop 352Z, wherein it iteratively adjusts VR1 and VR0 in a closed-loop manner, so as to minimize EC1 and EC0, indicating VR1 and VR0 are optimally positioned. If an adaptation of VR1 leads to a smaller (greater) EC1, it suggests the adaptation heads to the right (wrong) direction, and therefore we must keep (reverse) the direction and adapt again. Likewise, if an adaptation of VR0 leads to a smaller (greater) EC0, it suggests the adaptation heads to the right (wrong) direction, and therefore we must keep (reverse) the direction and adapt again. In this manner, VR1 and VR0 are adapted to maximize consistencies among RDE, RD, and RDL.

Note that the DSP unit 350 works in the clock domain of CK3. Therefore, clock cycles here refer to clock cycles of CK3.

Note that "1024 clock cycles" in algorithm 352 are by way of example but not limitation. If it is chosen to use more (less) clock cycles, the reference voltage adaptation will be slower (faster) but less (more) prone to noise. Also, there is no need for the number of clock cycles to be the same for waiting the timing recovery to settle and for waiting for EC1 and EC0 to be calculated.

In an embodiment, VR1 and VR0 are generated by using a first DAC (digital-to-analog converter) and a second DAC, respectively. In this case, VR1 and VR0 are adapted by adapting a first digital code that controls the first DAC and a second digital code that controls the second DAC. Digital-to-analog converters are well known in the prior art and thus not described in detail here.

In another embodiment, VR1 and VR0 are pre-determined in an offline manner instead of being dynamically adapted by CDR unit 235 of FIG. 2A. This embodiment is suitable for applications where characteristics of the transmission path (e.g., parasitic capacitors, length of the transmission line 220, and so on) are pre-known, optimal values of VR1 and VR0 can be pre-determined, and therefore there is no need for CDR unit 235 of FIG. 2A to dynamically adapt the values of VR1 and VR0. In an embodiment, the logical signal transmission system 200 of FIG. 2A is part of a DDR (double data rate) SDRAM (synchronous dynamic random access memory) system.

By way of example but not limitation, in an embodiment: a data rate of the source data SD is 2500 Mb/s; $Z_0$ is 50 Ohm; V2 is between 0.4V and 1V; VT is 0.7V; an initial value for VR1 is 0.8V; an initial value for VR0 is 0.6V; DV (i.e. an amount of incremental change for VR1 and VR0) is 10 mV; and Δ (the timing difference between CK1 and CK2, and also the timing difference between CK2 and CK3) is 150 ps.

The term "unit" is sometimes used herein. For example, CDR unit and DSP unit are terms used herein. As will be understood by persons skilled in the art, the term "unit" as used herein is generally used to refer to electronic circuits. As will be further appreciated, a circuit may be a circuit of discrete components, an application specific integrated circuit, or a general purpose circuit having a processor and memory that when loaded with executable code, becomes specifically configured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system comprising:
   a driver circuit configured to receive a source data and output a first voltage at a first node;
   a transmission line having a characteristic impedance configured to couple the first node to a second node;
   a three-point three-level slicer circuit configured to receive a second voltage at the second node and output a first ternary signal, a second ternary signal, and a third ternary signal in accordance with a first reference voltage, a second reference voltage, a first clock, a second clock, and a third clock; and
   a CDR (clock-data recovery) circuit configured to receive a reference clock, the first ternary signal, the second ternary signal, and the third ternary signal and output a recovered data, the first reference voltage, the second reference voltage, the first clock, the second clock, and the third clock.

2. The system of claim 1, wherein the CDR circuit comprises:
   a delay chain configured to receive the reference clock and output the first clock, the second clock, and the third clock in accordance with a first delay code, a second delay code, and a third delay code, respectively;
   a resolution circuit configured to receive the first ternary signal, the second ternary signal, and the third ternary signal and output the recovered data, a first alternative recovered data, and a second alternative recovered data; and
   a DSP (digital signal processing) circuit configured to receive the recovered data, the first alternative recovered data, and the second recovered data and output the first delay code, the second delay code, the third delay code, the first reference voltage, and the second reference voltage.

3. The system of claim 2, wherein the DSP circuit adjusts the first delay code, the second delay code, and the third delay code so that the first alternative recovered data and the second alternative recovered data equally agree with the recovered data.

4. The system of claim 2, wherein the DSP circuit adjusts the first reference voltage so that the first alternative recovered data and the second alternative recovered data equally agree with the recovered data when the recovered data was in a first logical state in a previous clock cycle.

5. The system of claim 4, wherein the DSP circuit adjusts the second reference voltage so that the first alternative recovered data and the second alternative recovered data equally agree with the recovered data when the recovered data was in a second logical state in the previous clock cycle.

6. The system of claim 2, wherein the first reference voltage and the second reference are generated by a first digital-to-analog converter and a second digital-to-analog converter, respectively.

7. A method comprising:
receiving a source data;
driving a first voltage at a first node in accordance with the source data;
propagating the first voltage to a second node via a transmission line of a characteristics impedance to establish a second voltage;
shunting the second node with a shunt resistor of resistance approximately equal to the characteristic impedance;
slicing, using a three-point three-level slicer circuit, the second voltage into a first ternary signal, a second ternary signal, and a third ternary signal in accordance with a first clock, a second clock, and a third clock, respectively, based on comparing the second voltage with a first reference voltage and with a second reference voltage;
resolving, using a clock-data recovery circuit, a recovered data, a first alternative recovered data, and a second alternative recovered data based on analyzing the first ternary signal, the second ternary signal, and the third ternary signal; and
adjusting the first reference voltage, the second reference voltage, the first clock, the second clock, and the third clock in accordance with a relationship among the recovered data, the first alternative recovered data, and the second alternative recovered data.

8. The method of claim 7, wherein the first clock, the second clock, and the third clock are adjusted so that the first alternative recovered data and the second alternative recovered data equally agree with the recovered data.

9. The method of claim 7, wherein the first reference voltage is adjusted so that the first alternative recovered data and the second alternative recovered data equally agree with the recovered data when the recovered data was in a first logical state in a previous clock cycle.

10. The method of claim 7, wherein the second reference voltage is adjusted so that the first alternative recovered data and the second alternative recovered data equally agree with the recovered data when the recovered data was in a second logical state in the previous clock cycle.

11. The system of claim 1, further comprising an impedance matching network coupled to the three-point three-level slicer circuit, the impedance matching comprising a resistance approximately equal to the characteristic impedance.

12. The system of claim 1, wherein the three-point three-level slicer circuit comprises first and second comparators, the first comparator configured to compare the second voltage with the first reference voltage according to the first clock, the second comparator configured to compare the second voltage with the second reference voltage according to the first clock.

13. The system of claim 12, wherein the three-point three-level slicer circuit comprises first and second data flip flops coupled respectively to the first and second comparators, the first data flip flop configured to receive an output of the first comparator and output a first signal according to the third clock, the second data flip flop configured to receive an output of the second comparator and output a second signal according to the third clock, the first and second signals corresponding to the first ternary signal.

14. The system of claim 13, wherein the three-point three-level slicer circuit comprises third and fourth comparators, the third comparator configured to compare the second voltage with the first reference voltage according to the second clock, the fourth comparator configured to compare the second voltage with the second reference voltage according to the second clock.

15. The system of claim 14, wherein the three-point three-level slicer circuit comprises third and fourth data flip flops coupled respectively to the third and fourth comparators, the third data flip flop configured to receive an output of the third comparator and output a third signal according to the third clock, the fourth data flip flop configured to receive an output of the fourth comparator and output a fourth signal according to the third clock, the third and fourth signals corresponding to the second ternary signal.

16. The system of claim 15, wherein the three-point three-level slicer circuit comprises fifth and sixth comparators, the fifth comparator configured to compare the second voltage with the first reference voltage according to the third clock, the sixth comparator configured to compare the second voltage with the second reference voltage according to the third clock, wherein the fifth and sixth provide respective outputs that collectively correspond to the third ternary signal.

17. The system of claim 2, wherein the resolution circuit comprises plural multiplexers configured respectively to receive the first ternary signal, the second ternary signal, and the third ternary signal and respectively output the recovered data, the first alternative recovered data, and the second alternative recovered data based on a previous value of the recovered data from a previous cycle.

18. The system of claim 2, wherein the delay chain comprises plural buffers in a cascade topology and plural multiplexers, the plural multiplexers configured to respectively receive the first, second, and third delay codes and plural outputs of the plural buffers and output the first, second, and third clocks.

19. An apparatus comprising:
a three-point three-level slicer circuit configured to receive a voltage and output a first ternary signal, a second ternary signal, and a third ternary signal in accordance with a first reference voltage, a second reference voltage, a first clock, a second clock, and a third clock; and
a CDR (clock-data recovery) circuit configured to receive a reference clock, the first ternary signal, the second ternary signal, and the third ternary signal and output a recovered data, the first reference voltage, the second reference voltage, the first clock, the second clock, and the third clock.

20. The apparatus of claim 19, wherein the CDR circuit comprises:

a delay chain configured to receive the reference clock and output the first clock, the second clock, and the third clock in accordance with a first delay code, a second delay code, and a third delay code, respectively;

a resolution circuit configured to receive the first ternary signal, the second ternary signal, and the third ternary signal and output the recovered data, a first alternative recovered data, and a second alternative recovered data; and a DSP (digital signal processing) circuit configured to receive the recovered data, the first alternative recovered data, and the second recovered data and output the first delay code, the second delay code, the third delay code, the first reference voltage, and the second reference voltage.

* * * * *